(12) United States Patent
Van Dalfsen

(10) Patent No.: US 11,297,847 B2
(45) Date of Patent: Apr. 12, 2022

(54) LIQUID TREATMENT SYSTEM FOR CONCENTRATING RAW MILK, AND METHOD THEREFOR

(71) Applicant: Harm Van Dalfsen, Steenwijk (NL)

(72) Inventor: Harm Van Dalfsen, Steenwijk (NL)

(73) Assignee: Harm Van Alfsen, Steenwijk (NL)

( * ) Notice: Subject to any disclaimer, the term of this patent is extended or adjusted under 35 U.S.C. 154(b) by 76 days.

(21) Appl. No.: 16/304,197

(22) PCT Filed: May 24, 2017

(86) PCT No.: PCT/NL2017/050333
§ 371 (c)(1),
(2) Date: Nov. 23, 2018

(87) PCT Pub. No.: WO2017/204638
PCT Pub. Date: Nov. 30, 2017

(65) Prior Publication Data
US 2019/0327992 A1    Oct. 31, 2019

(30) Foreign Application Priority Data

May 25, 2016   (NL) ...................... 2016829

(51) Int. Cl.
*A23C 1/00*   (2006.01)
*A23C 9/142*  (2006.01)
(Continued)

(52) U.S. Cl.
CPC .............. *A23C 9/1427* (2013.01); *A23C 1/00* (2013.01); *B01D 61/025* (2013.01); *B01D 61/08* (2013.01);
(Continued)

(58) Field of Classification Search
CPC ....... C02F 1/44; A23C 9/1427; A23C 9/1425; A23C 1/00; B01D 2311/04;
(Continued)

(56) References Cited

U.S. PATENT DOCUMENTS

2011/0198275 A1 * 8/2011 Hayes ................... C02F 1/441
                                                          210/251
2018/0028980 A1 * 2/2018 Ikeda ....................... B01F 5/04

FOREIGN PATENT DOCUMENTS

CN    204352630 U  *  5/2015
EP       0301956 A2    2/1989
(Continued)

OTHER PUBLICATIONS

English language machine translation of NL 198001095 A, 9 pages, No Date.*
(Continued)

*Primary Examiner* — Pranav N Patel
(74) *Attorney, Agent, or Firm* — Kacvinsky Daisak Bluni PLLC

(57) ABSTRACT

A liquid treatment system, in particular for concentrating milk, and method therefor. The system includes an inlet configured to receive fresh raw milk; and a pressure vessel connected to the inlet. The pressure vessel is provided with a pressure system configured to realize a pressure of at least 10 bar in the pressure vessel. A reverse osmosis membrane is included for filtering the raw milk. A pump is provided for pumping the raw milk under pressure out of the pressure vessel and through or along the reverse osmosis membrane. A permeate outlet is provided for the separated water and a milk outlet is provided for the concentrated milk.

17 Claims, 6 Drawing Sheets

(51) Int. Cl.
*B01D 61/02* (2006.01)
*B01D 61/08* (2006.01)

(52) U.S. Cl.
CPC .... *B01D 2313/243* (2013.01); *B01D 2315/14* (2013.01)

(58) Field of Classification Search
CPC .... B01D 2311/10; B01D 61/04; B01D 61/08; B01D 61/025; B01D 61/16; B01D 2313/50; B01D 2313/24; B01D 2313/243; B01D 2315/14
See application file for complete search history.

(56) References Cited

FOREIGN PATENT DOCUMENTS

| | | | |
|---|---|---|---|
| JP | WO2016017335 A1 * | 4/2016 | |
| NL | 8001095 A | 9/1981 | |
| WO | 2008088230 A1 | 7/2008 | |

OTHER PUBLICATIONS

English language machine translation of CN204352630U, 10 page, No Date.*
International Search Report and Written Opinion from PCT/NL2017/050346 dated Jul. 7, 2017, pp. 11.
Kocak HR: "Dairy products manufactured from whole milk concentrated by reverse osmosis. I. UHT products", Australian Journal of Dairy Technology, Dairy Industry Association of Australia, Melbourne, AU, vol. 40, No. 3, Sep. 1, 1985 (Sep. 1, 1985), pp. 96-100, XP009125048, ISSN: 0004-9433.
Kessler HG: "Lebensmittel-und Bioverfahrenstechnik/Molkereitechnologie, Membrantrennverfahren", Jan. 1, 1996 (Jan. 1, 1996), Lebensmittel-Und Bioverfahrenstechnik/Molkereitechnologie, Membrantrennverfahren, Verlag A.Kessler, Munchen, pp. 56-58,79, XP002617881.
Kessler HG: "Lebensmittel-und Bioverfahrenstechnik/Molkereitechnologie, Membrantrennverfahren", 1 Jan. 3, 1996 (Jan. 1, 1996), Lebensmittel-Und Bioverfahrenstechnik/Molkereitechnologie, Membrantrennverfahren, Verlag A.Kessler, Munchen, pp. 56-58,79, XP002617881 Translation included.

* cited by examiner

LIQUID TREATMENT SYSTEM FOR CONCENTRATING RAW MILK, AND METHOD THEREFOR

This is a national stage application filed under 35 U.S.C. § 371 of pending international application PCT/NL2017/050333 filed May 24, 2017, which claims priority to Netherlands Patent application NL 2016829, filed May 25, 2016, the entirety of which applications are hereby incorporated by reference herein.

The present invention relates to a liquid treatment system for concentrating a liquid, preferably raw milk in particular. This raw milk relates particularly to cow's milk, though is not limited exclusively thereto.

In the conventional production of milk the milk is produced on a farm and stored here in a tank. The produced milk is then collected using tank trucks and transported to a processing plant. At the processing plant the milk is concentrated, or thickened, by removing water. Concentration of milk is applied on particularly large scale in the industry to make for instance milk powder and condensed milk.

A problem in the conventional milk process is that large quantities of water are stored, cooled and transported. Water does after all form a main component of milk. In the final processing of milk to a desired product, including milk powder, cheese and yoghurt, a large part of this water is not required, and is even superfluous. In the industry (a large part of) the water is therefore separated from the milk.

It is known in practice to apply ultrafiltration in the concentration of milk by carrying the milk along or through a filtration membrane. This is applied particularly at dairy farms of relatively large size, in particular farms with more than 2000 milking cows. At this size the dairy farm is also a milk processing plant. This is applied particularly in the case of such large farms housed at remote locations.

A problem with membrane filtration is that costs of these installations are usually high, so that they are not usable in effective manner by smaller dairy farms.

A further problem is that a loss of milk components, such as proteins, lactose and minerals, occurs due to the membrane filtration. The milk quality hereby deteriorates.

The present invention therefore has for its object to provide a liquid treatment system for concentrating raw milk which can also be applied effectively on the scale of relatively small dairy farms.

This object is achieved by providing a liquid treatment system according to the invention which is suitable for concentrating raw milk, the system comprising:
  an inlet configured to receive fresh raw milk;
  a pressure vessel connected to the inlet, wherein the pressure vessel is provided with a pressure system configured to realize a pressure of at least 10 bar in the pressure vessel;
  a reverse osmosis membrane for filtering the raw milk;
  a pump for pumping the raw milk under pressure out of the pressure vessel and through or along the reverse osmosis membrane; and
  a permeate outlet for the separated water and a milk outlet for the concentrated milk.

By providing the liquid treatment system with a pressure vessel connected operatively to a pressure system, preferably substantially the whole system can be placed under an overpressure, in particular an overpressure of at least 10 bar, preferably at least 12 bar, more preferably at least 15 bar and most preferably at least 20 bar. Employing an overpressure of at least 15 or 20 bar results in an effective concentration process. Providing an overpressure with the pressure system achieves that great pressure differences, and in particular significant pressure drop, do not occur during the treatment of the raw milk. It has been found that, by performing the treatment at a substantially constant pressure in the system, no fat globules in the milk are for instance broken down.

A further particular advantage of performing the treatment process at a substantially high pressure is that no great fluctuations occur in the flow velocity of the milk Owing to this more constant milk flow velocity there occur fewer collisions of particles in the milk Because of the reduction in collisions fewer fat globules for instance in the milk will thus be destroyed. By avoiding, or at least reducing, this breakdown of particles according to the invention, the milk becoming unusable or less suitable for milk products such as cheese, (drinking) milk and the like is also avoided.

Using the treatment system according to the invention the volume of the milk is preferably reduced to 30-60%, preferably 40-50%, of the original volume. The 30% reduction is for instance applied here for further processing to a cheese product, and the 50% reduction is applied for processing to milk powder.

Providing a reverse osmosis membrane achieves that it is substantially water which will penetrate through the membrane such that the discharged permeate flow consists substantially only of water. This has the result that all other components in the milk, including suspended particles, macromolecules, polyvalent salts, small dissolved substances and salts, remain present in the treated milk. The separated water is subsequently discharged via a permeate outlet. As additional advantage it has been found that the quality of the separated water approximates or even matches the quality of drinking water. A milk outlet transports the concentrated milk further for (cooled) storage in a milk tank and/or transport with a tank truck. The reverse osmosis membrane is preferably provided with passage openings in the range of 0.1-1 nm. It has been found that said passage openings enable separation of water from the raw milk flow, wherein relevant content components are retained in the (concentrated) milk such that the milk quality also remains preserved.

The pressure system is particularly configured to realize a pressure of at least 10 bar in the system. It has been found that a better separation of water by means of the reverse osmosis membrane is achieved at such a pressure. The pressure system can make use here of a direct gas pressure at which the pressure is exerted directly on the milk by the gas, or an indirect gas pressure at which pressure is built up in the system on an expansion tank principle by as it were inflating or deflating a membrane separation, whereby a pressure in the system can be respectively increased or decreased.

In a currently preferred embodiment the pressure system comprises a supply container configured to supply inert gas to the pressure vessel. This provision of a supply container for the pressure system is applied particularly in a so-called direct pressure system wherein the preferably inert gas is in contact with the milk to be treated. It has been found that an effective treatment system is hereby obtained wherein, with a limited number of components, a system can be brought to and held at a higher pressure during the treatment of the milk. This increases the robustness and ease of cleaning of the treatment system in this embodiment according to the invention.

The inert gas is preferably nitrogen and/or, as alternative, (pure) air. It is found that applying particularly an inert gas such as nitrogen does not adversely affect the milk quality.

In addition, nitrogen can be supplied in effective manner to the system when it is required to bring the system to and/or hold it at pressure.

Provided additionally or alternatively according to the invention is a compressor for pressurizing the pressure vessel. This avoids a gas tank for instance having to be replaced or replenished. This for instance enhances the continuity of the process. The permeate of the system is particularly water which comes from the milk and which can be used for other purposes. In a currently preferred embodiment this water is of a high temperature, for instance of about 37° C. This water can be used as drinking water for calves or cows and/or for the purpose of (pre-) cleaning components of the milk system or other systems. In the case of water at said high temperature it is also possible to extract energy from this water flow so as to thereby further increase the energy-efficiency of a treatment system in this embodiment according to the invention.

In an advantageous preferred embodiment according to the present invention the system further comprises a heat exchanger for maintaining the temperature of fresh raw milk.

By providing a heat exchanger the fresh raw milk treated in the treatment system can be kept at a desired temperature, for instance about 37° C. In addition, a substantially constant temperature can also be realized with the heat exchanger during the treatment process. It has been found that the milk quality can hereby remain substantially preserved such that no loss of quality occurs during the treatment process.

In an advantageous preferred embodiment according to the present invention the system further comprises a recirculation conduit for recirculating the milk over or along the reverse osmosis membrane.

Providing a recirculation conduit achieves that the milk can be carried a number of times along the reverse osmosis membrane. A further concentration of the treated milk can hereby be realized. It is particularly possible in this embodiment to adapt the process of concentrating the raw milk to the intended purpose of the raw milk.

It is thus possible for instance to reduce raw milk for instance 30% in volume for cheese production and to reduce raw milk for instance 50% in volume for the production of milk powder. Because the process is adapted in this way to the intended purpose of the raw milk produced, the treatment system according to the invention can be employed in effective manner and thereby forms part of the overall production process for the dairy products.

In a currently preferred embodiment according to the invention the temperature of the raw milk lies in the range of 35-40° C., more preferably in the range of 36-38° C. and most preferably amounts to 37° C.

It has been found that, through the treatment of the fresh raw milk at a temperature of in particular about 37° C., the concentration process can take place in effective manner, particularly in combination with the increased system pressure, without the milk quality deteriorating. Processing of the warm milk particularly provides a greater flux/permeate output at the reverse osmosis membrane than at lower milk temperatures. The concentration process is hereby as it were accelerated and the residence time of milk in the treatment system can remain relatively short. This has the additional consequence that the influence of bacteria on the milk remains limited. The quality value of the milk particularly remains preserved in respect of, among others, contents of fat, lactose and the like.

In a currently preferred embodiment according to the invention the pressure system is configured to provide a pressure in the range of 10-100 bar, more preferably in the range of 12-25 bar, and most preferably about 20 bar is realized.

It has been found that in such a currently preferred embodiment with a system pressure of about 20 bar the concentration process takes place in effective manner. This has for instance the result that a good concentration efficiency is achieved with the relatively limited residence time of milk within the system.

In a currently preferred embodiment according to the invention the pump comprises a lobe pump.

By providing a positive displacement pump, in particular a lobe pump, a substantially constant milk float can be provided with a substantially constant, or at least almost constant velocity. Differences in velocity are hereby avoided during the treatment process and the milk quality remains substantially preserved. The application of a lobe pump also achieves that the occurrence of pressure differences is minimized. This likewise has a positive effect on preserving the milk quality.

In a further advantageous preferred embodiment according to the present invention the inlet is connected operatively to a milking robot.

An effective milk concentration process is made possible by operative connection of the inlet of the liquid treatment system to a milking robot. This is realized in that the milking robot provides a gradual supply of milk to the treatment system. The treatment system can hereby be operated in continuous or semi-continuous manner and the milk is preferably treated immediately directly from the milking robot before the milk is carried into the cooled milk tank. Because of the gradual supply the treatment system can take a relatively small-scale form. This makes the liquid treatment system according to the invention advantageously and effectively applicable in this embodiment.

The invention further relates to a method for concentrating fresh raw milk, the method comprising the steps of:
  supplying raw milk to a liquid treatment system in any of the above discussed embodiments;
  pressurizing the system by supplying a gas;
  carrying the fresh raw milk through the system with the pump;
  separating water from the fresh raw milk with the reverse osmosis membrane; and
  separately discharging separated water and the concentrated milk.

The method provides similar effects and advantages as described for the liquid treatment system. The method particularly provides an effective manner of reducing the volume of fresh raw milk, whereby transport can be carried out more effectively without the quality of the milk deteriorating.

In a currently preferred embodiment the system is brought under (over)pressure by supplying an inert gas, for instance nitrogen. Supplying an inert gas achieves that the whole system is operated at a relatively high pressure such that pressure changes and pressure fluctuations are avoided. In a currently preferred embodiment use is made here of a direct gas pressure as already further elucidated above.

In a further advantageous embodiment the milk to be treated is recirculated through or along the reverse osmosis membrane. The concentration can hereby be adjusted to the desired concentration percentage. It is even possible here to adapt the concentration percentage to the intended further processing of the produced milk.

The temperature of the milk preferably lies in the range of 35-40° C., more preferably in the range of 36-38° C., and the temperature most preferably amounts to about 37° C. It is found that an effective treatment process is realized at this temperature.

The pressure employed in the treatment system preferably amounts to about 10-100 bar, more preferably about 12-25 bar, and amounts most preferably to about 20 bar. It has been found that the most effective concentration process is provided at such a pressure.

It is expressly possible according to the invention to combine the various options and embodiments to form new options and embodiments. It is thus possible for instance to combine said temperatures and the pressures and, in a currently preferred embodiment, a combination thereof with a heat exchanger and optional recirculation.

Further advantages, features and details of the invention are elucidated on the basis of preferred embodiments thereof, wherein reference is made to the accompanying drawings, in which.

Figure 1:
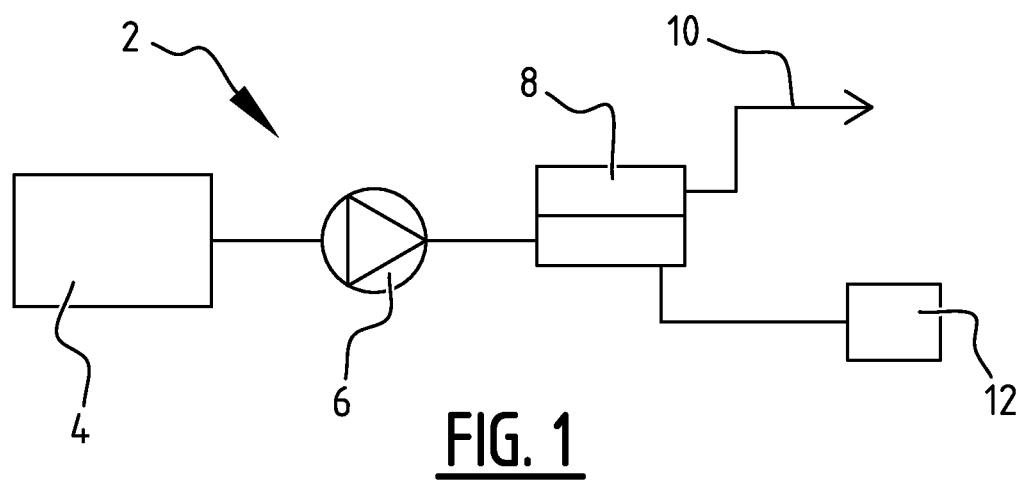
FIG. 1 shows a liquid treatment system according to the invention.

Milk treatment system 2 (FIG. 1) is connected operatively to milking robot 4. Milk is carried by means of lobe pump 6 and a (gas) pressure system to reverse osmosis membrane 8. The water separated by membrane 8 is discharged via permeate outlet 10 and optionally used for further applications. The concentrated milk is subsequently transported further to cooled milk tank 12. Milk will then be collected from milk tank 12 for further processing.

Figure 2:
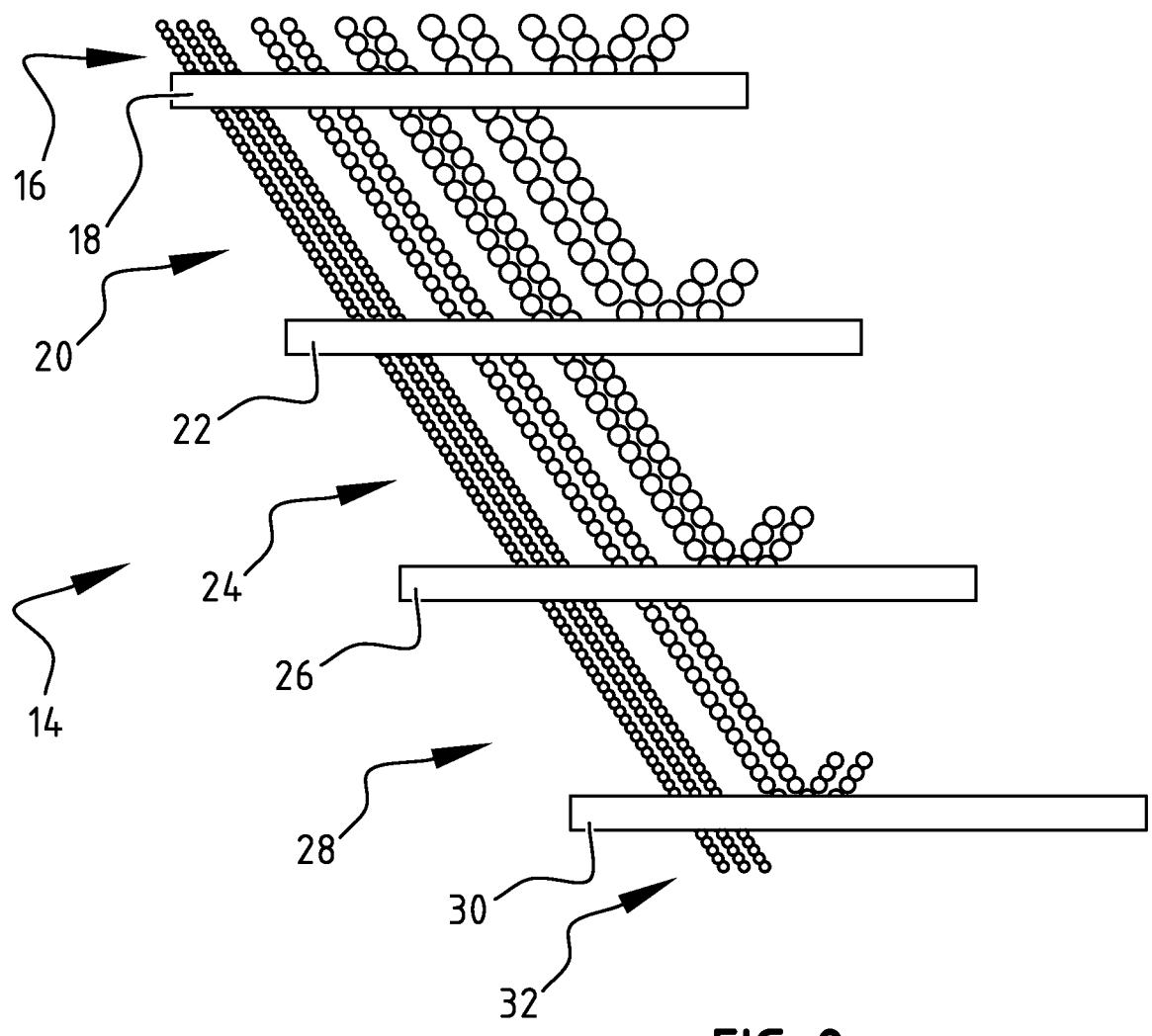
FIG. 2 is a schematic representation of the effect of applying the reverse osmosis membrane in the system according to the invention.

The effect of applying reverse osmosis membrane 8 for the concentration process for milk is elucidated on the basis of illustrative operating principle 14 (FIG. 2). Supplied raw milk flow 16 comprises suspended particles, selected macromolecules, polyvalent salts and small dissolved substances, salts and water. If milk flow 16 is treated with microfiltration membrane 18, a few suspended particles will be removed and other components are separated from the milk flow. Microfiltration membrane 18 is typically provided here with openings with a pore size in the range of 0.1-20 µm. In the shown illustrative operating principle 14 milk flow 20 can alternatively be treated with ultrafiltration membrane 22. In addition to the suspended particles, a number of selected macromolecules in the milk are hereby also removed. Other components are however allowed to pass through. Ultrafiltration membrane 22 typically has openings in the range of about 2 nm to 0.1 µm. Salts for instance are however allowed through and therefore discharged from the milk flow. If use were made of nanofiltration membrane 26 for milk flow 24 it would also be possible to retain polyvalent salts and small dissolved substances in the milk flow. Nanofiltration membrane 26 typically has openings of about 1 nm.

Use is made according to the invention of reverse osmosis membrane 30. For milk flow 28 according to the illustrative operating principle 14 all relevant components, including salts, hereby remain preserved in the milk flow, and only a separated water flow 32 is provided. It follows from operating principle 14 that, with use of reverse osmosis in the concentration process according to the invention, relevant components remain preserved in effective manner in the milk flow and only water flow 32 is separated during the concentration process.

In the shown embodiment alternative milk treatment system 102 (FIG. 3) treats milk from milking robot 104. Lobe pump 106 carries milk through or along reverse osmosis membrane 108. Permeate outlet 110 discharges water from system 102. Concentrated milk is carried via the milk outlet out of system 102 to cooled milk tank 112. System 102 is provided with pressure vessel 114 into which is introduced milk from milking robot 104. Pressure system 116 with safety components realizes the desired pressure in system 102. The pressure system is provided for this purpose with separate gas tank 118, in particular for nitrogen, with which gas can be carried via pressure-reducing valve 120 and valve 122 into pressure vessel 114. System 102 is further provided with heat exchanger 124 and a number of valves 126, 130 and sensors 128.

In the shown treatment system 2, 102 milk is supplied via milking robot 4, 104. In continuous treatment system 2 milk is carried via pump 6 to membrane 8 and the concentrated milk is subsequently carried into milk tank 12. Water is discharged via permeate outlet 10. In the semi-continuous or batch system 102 milk is carried into pressure vessel 114. Pressure vessel 114 is then brought to pressure using pressure system 116, including gas tank 118. Using lobe pump 106 milk is carried from pressure vessel 114 to or along membrane 108 and fed back via heat exchanger 124 to pressure vessel 114. Water is discharged semi-continuously via membrane 108 and permeate outlet 110. The milk for concentration is preferably recirculated over pump 106, membrane 108, heat exchanger 124 and pressure vessel 114. When the desired concentration percentage has been reached, the concentrated milk can be carried via valve 130 to milk tank 114. Conditions such as temperature, flow velocity and pressure can be measured with sensors 128. In the shown embodiment the (over)pressure is removed here from system 102.

Various experiments have been performed with system 102. Use was made for the purpose of the experiments of a pressure vessel of about 30-45 litres, wherein an applied pressure was utilized to a maximum of about 25 bar. In the experiments the pump 106 was a so-called lobe pump with a flow rate of about 1000 litres per hour. This experiment demonstrated that concentration percentages of 40-50% are realizable without significant loss of milk quality, preferably making use of heat exchanger 124.

System 102 can be operated by making use of nitrogen to keep pressure vessel 114 at the desired system pressure. It is alternatively or additionally possible in an alternative embodiment to make use of sterile air brought to the desired pressure. If system 102 is operated in batchwise manner, the system pressure will preferably be relieved when the desired concentration percentage has been reached, and the concentrated milk will be transported further out of pressure vessel 114. In a possible embodiment sterile air is obtained by filtering and subsequently pressurizing ambient air, for instance to a pressure of about 20 bar.

In an energy-efficient embodiment gas can be fed back to gas tank 118 when the system pressure in system 102 is reduced. In this embodiment the gas can be for instance sterile air, nitrogen or other suitable gas.

Figure 3:
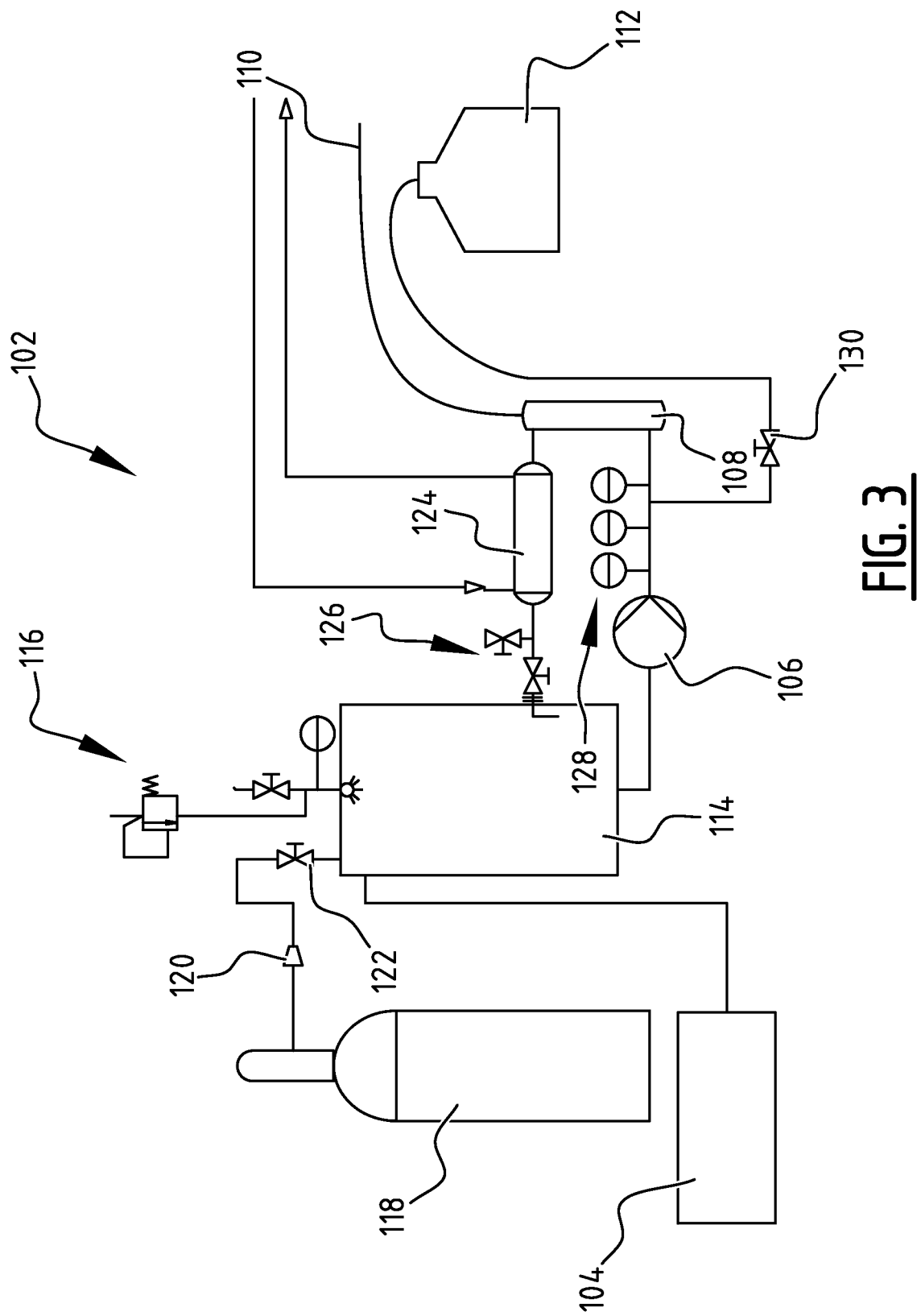
FIG. 3 shows an alternative liquid treatment system according to the invention.
Figure 4:
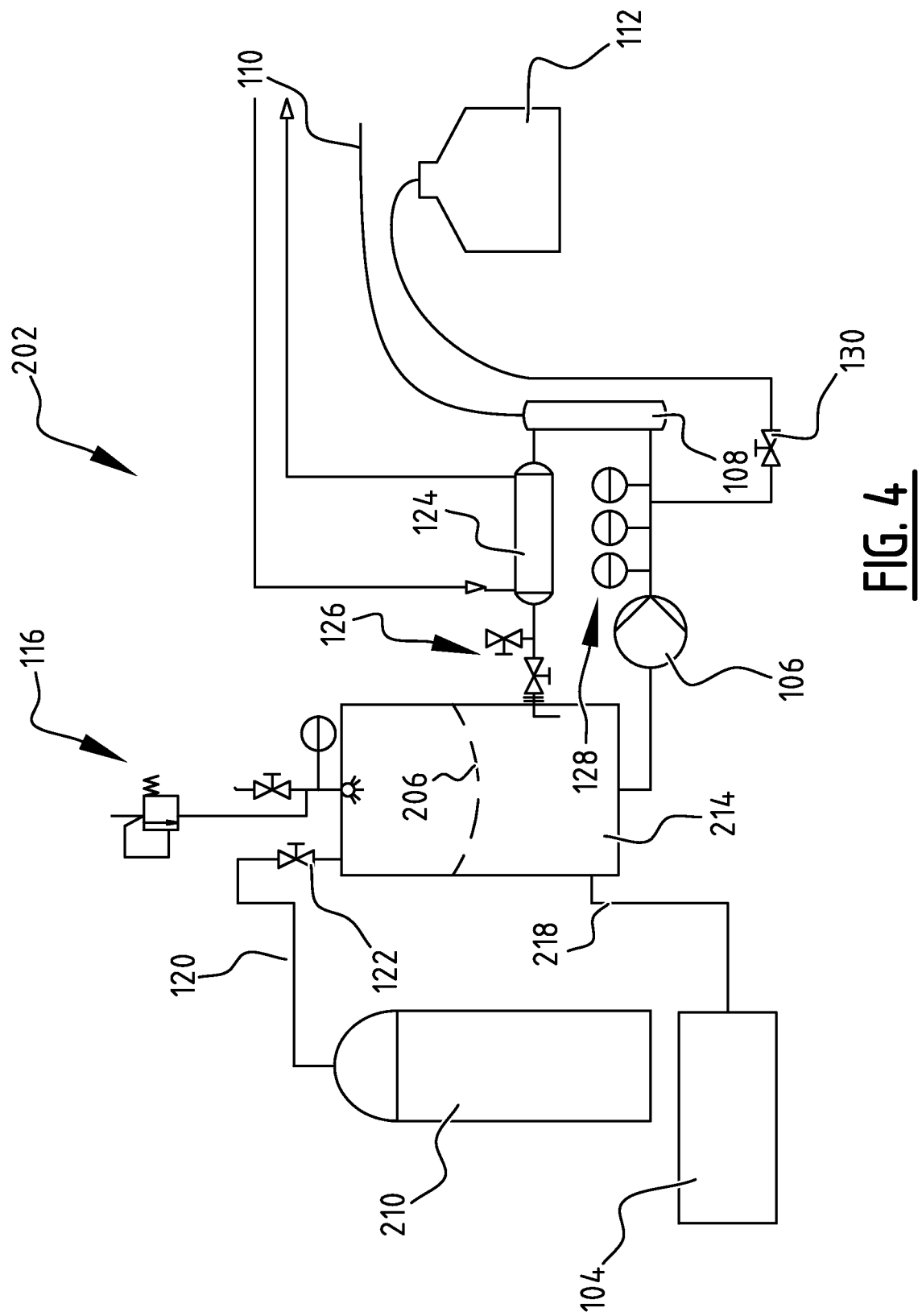
FIGS. 4-5 show further alternative liquid treatment systems according to the invention.

Alternative system 202 (FIG. 4) comprises in the shown embodiment various corresponding components as shown for system 102 in FIG. 3. Pressure vessel 214 is provided in system 202 with membrane 206, whereby a type of expansion vessel is obtained. Milk continues to be supplied via the feed 218 on a first side of membrane 206 and a pressure means, for instance water, continues to be supplied on the other, second side of membrane 206 from tank or vessel 210. The system pressure in system 202 can hereby be set and monitored in effective and controlled manner.

Figure 5:
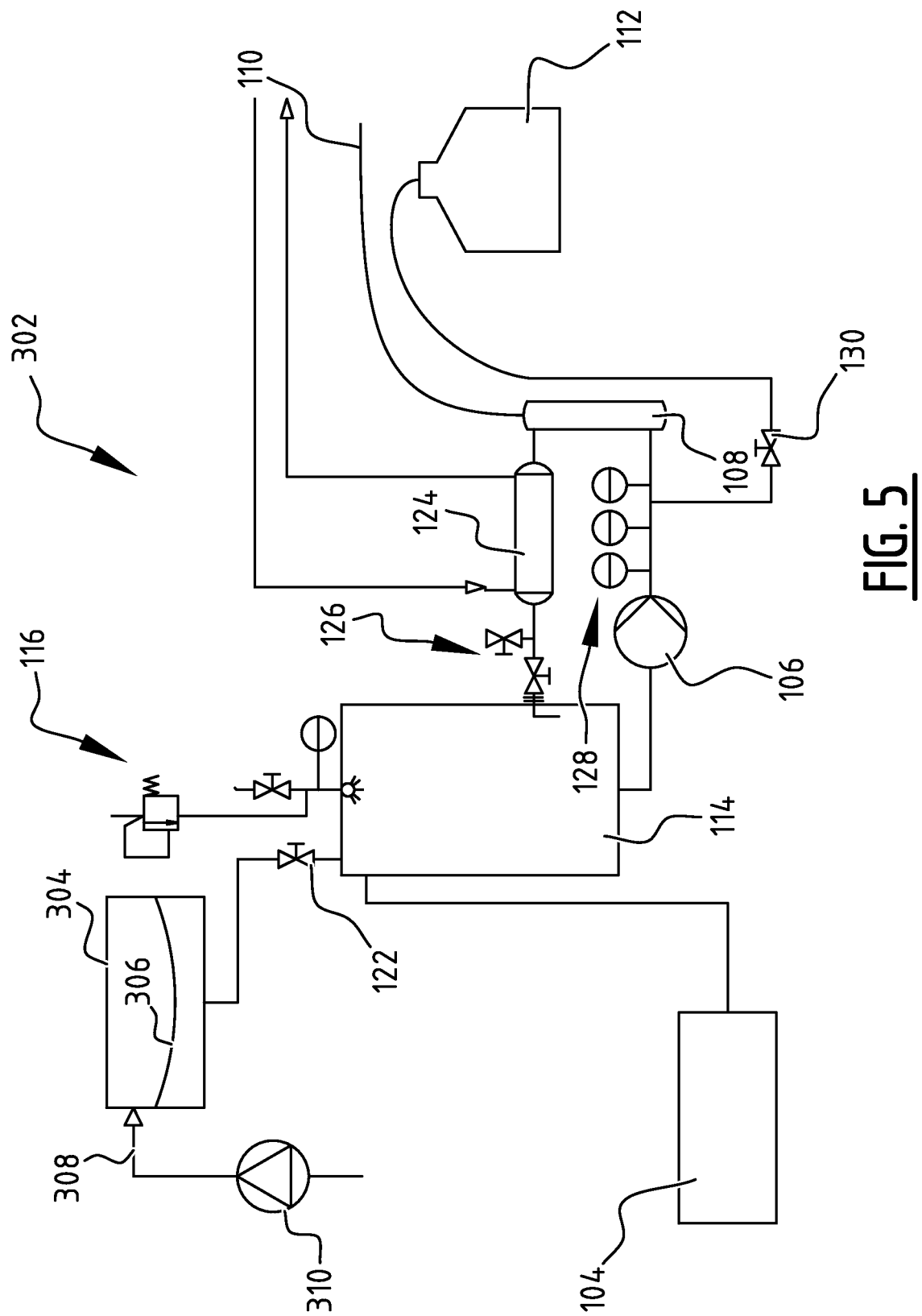

Further alternative system 302 (FIG. 5) comprises separate expansion vessel 304 provided with membrane 306. In the shown embodiment, using feed 308 and with high-pressure pump 310, a gas, for instance nitrogen, is pressurized by a first medium, for instance water. The system pressure in system 302 can hereby be regulated and controlled. In a current embodiment expansion vessel 304 is a number of times larger than pressure vessel 140.

In system 102 a continuous concentration process can if desired be combined with a batchwise discharge. Pressure vessel 114 can here remain at the system pressure. Discharge tank 112 is then preferably provided in the process flow upstream of a conventional milk tank. Discharge tank 112 receives concentrated milk. When discharge of the concentrated milk from discharge tank is desired, preferably only the discharge tank 112 is brought to normal pressure. Other components of system 102 preferably remain here at the system pressure. It is hereby possible to have the concentration process run continuously while discharge is carried out in batchwise manner.

It is possible if desired not to reduce the pressure of discharge tank 112 by releasing gas but, conversely, to reuse gas by feeding it back to gas tank 118. An energy-efficient embodiment is hereby obtained.

Figure 6:
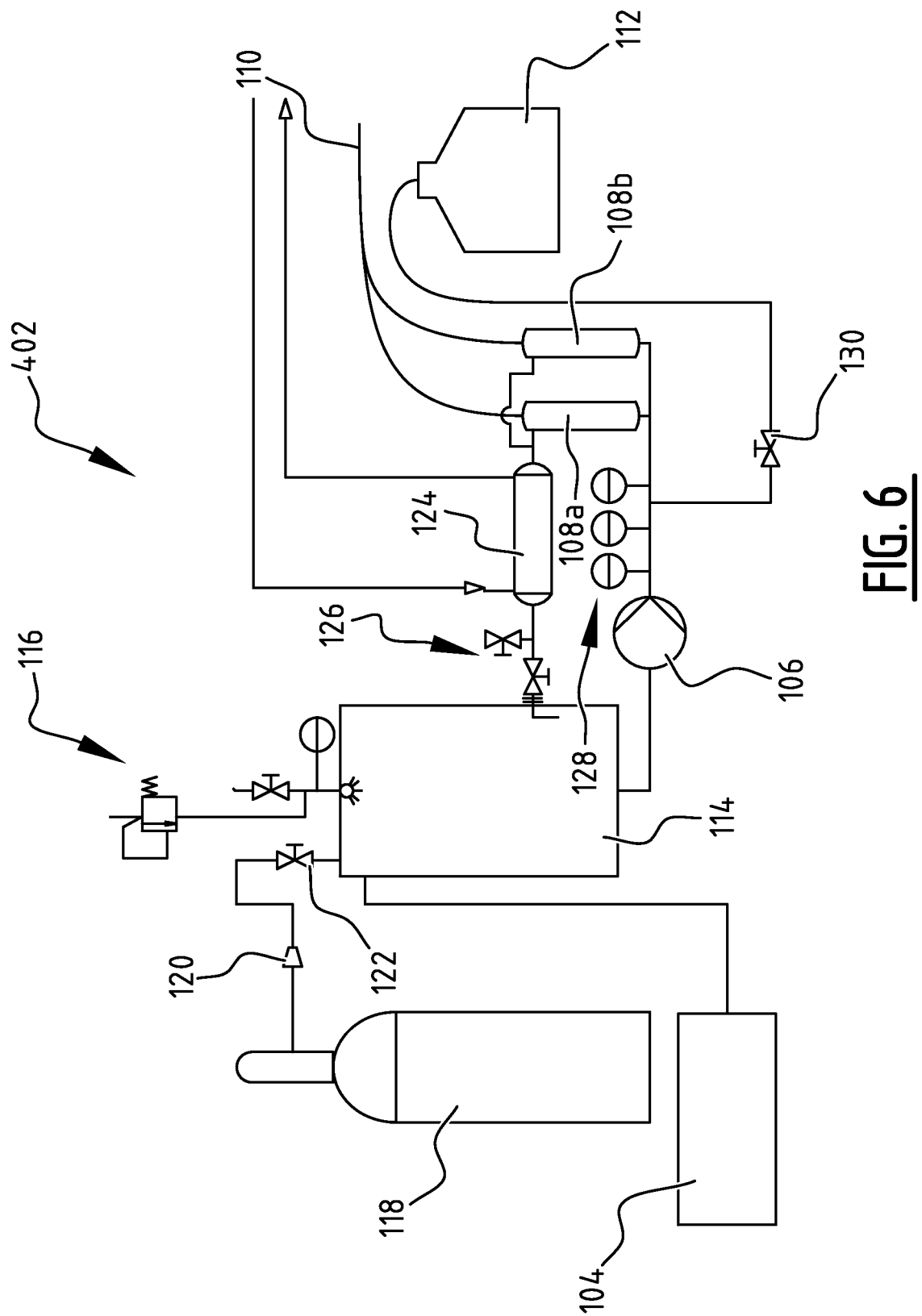
FIG. 6 shows yet another alternative liquid treatment system according to the invention.

It is optionally possible in the different embodiments to provide second membrane 108, for instance in system 402 (FIG. 6). Membrane 108a,b can be cleaned separately while the process can continue to run. The system pressure need only be removed here from the membrane 108 to be cleaned. This makes an effective concentration process possible. System 402 can be operated in continuous or batchwise manner.

Figure 7:
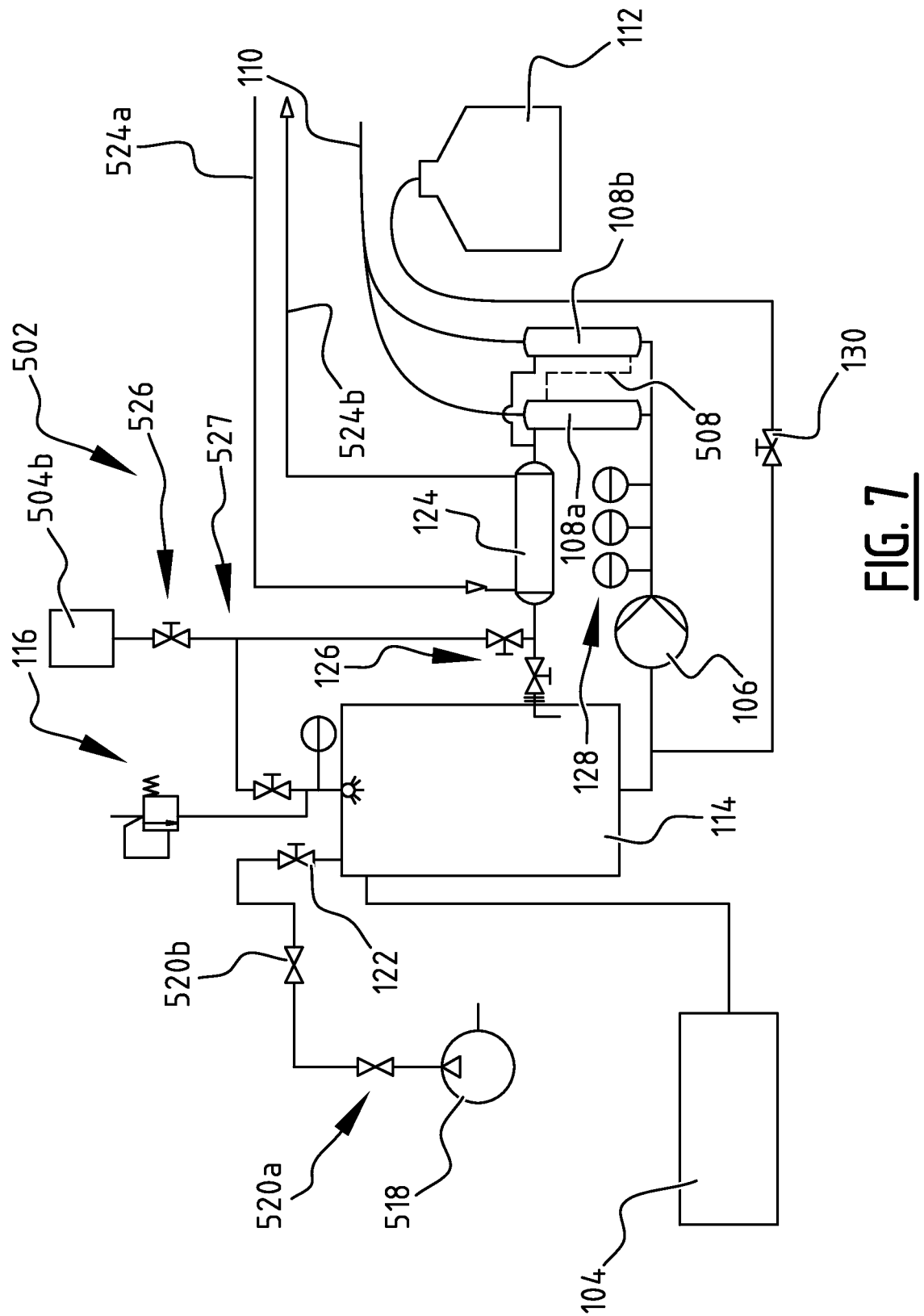
FIG. 7 shows a variant according to the invention of the system of FIG. 6.

System 502 (FIG. 7) shows a variant of system 402 (FIG. 6). A buffer tank 504b is optionally provided as addition or alternative to tank 104. Buffer tank 504b is provided with conduit system 527 with valves 126, 526 for the supply of milk and/or CIP circulation. Membranes 108a,b can optionally be used in parallel and/or in series with optional conduit 508. In the shown embodiment compressor 518 with valves 520a,b provides the desired pressure in pressure vessel 114. Compressor 518 functions here as alternative or addition to gas tank 118. Compressor 518 can also be applied in other embodiments. Heat exchanger 124 is provided in the shown embodiment with hot water feed 524a and cold water discharge 524b. Pump 106 is (also) controlled on the basis of sensors 128. In the shown embodiment concentrated milk from system 502 is carried from a position between vessel 114 and pump 106 to milk tank 112. It will be apparent that a different position and/or configuration of system 502 is likewise possible according to the invention.

Experiments with the system according to the invention demonstrate that a positive effect on (preserving) milk quality is achieved. The membrane used in the experiments was an RO membrane (reverse osmosis membrane) provided with passage openings in the range of 0.1-1 nm and a spacer thickness of 25-50 mm During the experiments the liquid treatment system was brought to pressure by means of air, sterile air and/or inert gas. Use is preferably made of a compressor which uses (sterile) air to build up pressure. It is hereby unnecessary during the experiments to replace a gas tank and the process remains continuous.

Investigated among other things in the experiments were the acidity of the milk fat and the germ count of the raw milk. The acidity of the milk fat remained within the norms during the process. The germ count also showed a desired value during the performed experiments. The experiments demonstrate that damage to fat globules is prevented. Lipolysis of the fat components of the milk by the fat-splitting enzyme, the lipase, present in the milk, can occur as a result of damage to the fat globules during passage of milk through for instance a pump and pressure-reducing valve. This fat globule damage is avoided by the different manner of pressure build-up and circulation in the system according to the invention. In the experiments the increase in free fatty acids remained within the norms applied by customers/dairy processor (max 1.00), with a value for raw milk of 0.54 mmol/100 g fat, and 0.47 mmol/100 g fat for concentrated milk Results of bacteriological study are shown in the following table.

TABLE 1

Bacteriological study (germ count)

| Sample Specification | Analysis | Result | Unit | Upper limit |
|---|---|---|---|---|
| Batch 3 | | | | |
| Raw milk | Enterobacteriaceae | <40 | cfu/ml | 1000 |
| Raw milk | Germ count 30° C. PCMA | 3500 | cfu/ml | 300000 |
| Raw milk | Therm.res. germ | 250 | cfu/ml | 2000 |
| Raw milk | Therm.resist. Strept. | 135 | cfu/ml | 2000 |
| Raw milk concentrated | Enterobacteriaceae | <100 | cfu/ml | 1000 |
| Raw milk concentrated | Germ count 30° C. PCMA | 20000 | cfu/ml | 300000 |
| Raw milk concentrated | Therm.res. germ | 230 | cfu/ml | 2000 |
| Raw milk concentrated | Therm.resist. Strept. | 200 | cfu/ml | 2000 |
| Batch 4 | | | | |
| Raw milk | Enterobacteriaceae | <40 | cfu/ml | 1000 |
| Raw milk | Germ count 30° C. PCMA | 3100 | cfu/ml | 300000 |
| Raw milk | Therm.res. germ | 76 | cfu/ml | 2000 |
| Raw milk | Therm.resist. Strept. | 81 | cfu/ml | 2000 |
| Raw milk concentrated | Enterobacteriaceae | <400 | cfu/ml | 1000 |
| Raw milk concentrated | Germ count 30° C. PCMA | 21000 | cfu/ml | 300000 |
| Raw milk concentrated | Therm.res. germ | 90 | cfu/ml | 2000 |
| Raw milk concentrated | Therm.resist. Strept. | 75 | cfu/ml | 2000 |

It follows from Table 1 that the system according to the invention produces a bacteriologically good milk quality. This system also separates water (permeate) from milk (concentrate) with the object of retaining all components in the milk, and thereby also the value thereof. Analyses of the water show that the water from the system retains the different components and is suitable for further application.

The present invention is by no means limited to the above described preferred embodiments thereof. The rights sought are defined by the following claims, within the scope of which many modifications can be envisaged.

The invention claimed is:
1. A liquid treatment system for concentrating raw milk, the system comprising:
   an inlet configured to receive fresh raw milk;
   a pressure vessel connected to the inlet, wherein the pressure vessel is provided with a pressure system configured to realize a pressure of at least 10 bar in the pressure vessel;

a reverse osmosis membrane for filtering the raw milk;

a pump for pumping the raw milk under pressure out of the pressure vessel and through or along the reverse osmosis membrane;

a recirculation line from an outlet of the reverse osmosis membrane to the pressure vessel for returning concentrated milk to the pressure vessel; and a permeate outlet for receiving separated water from the reverse osmosis membrane therethrough and a milk outlet coupled between the pressure vessel and the reverse osmosis membrane for receiving concentrated milk therethrough;

wherein the pressure vessel, the reverse osmosis membrane, the pump and the recirculation line are all configured to be pressurized to a system pressure of at least 10 bar during operation via the pressure system;

wherein the milk outlet is coupled to a discharge tank, and a valve is disposed in the milk outlet, and wherein the system is configured to, while discharge of concentrated milk from the discharge tank is being carried out, isolate the discharge tank from the pump, the pressure vessel and the recirculation line to allow the discharge tank to be brought to ambient pressure while maintaining the pressure vessel, the reverse osmosis membrane, the pump and the recirculation line at the system pressure of at least 10 bar.

2. The liquid treatment system as claimed in claim 1, wherein the inert gas comprises nitrogen.

3. The liquid treatment system as claimed in claim 2, the system further comprising a heat exchanger for maintaining a temperature of the fresh raw milk.

4. The liquid treatment system as claimed in claim 3, wherein the reverse osmosis membrane is provided with passage openings in the range of 0.1-1 nanometers (nm).

5. The liquid treatment system as claimed in claim 4, wherein the inlet is operatively connected to one or more milking robots.

6. The liquid treatment system as claimed in claim 1, the system further comprising a heat exchanger for maintaining a temperature of the fresh raw milk.

7. The liquid treatment system as claimed in claim 1, wherein a temperature of the raw milk lies in the range of 35-40° C.

8. The liquid treatment system as claimed in claim 1, wherein the pressure system is configured to provide a pressure in the range of 10-100 bar to the pressure vessel.

9. The liquid treatment system as claimed in claim 1, wherein the reverse osmosis membrane is provided with passage openings in the range of 0.1-1 nanometers (nm).

10. The liquid treatment system as claimed in claim 1, wherein the pump comprises a lobe pump.

11. The liquid treatment system as claimed in claim 1, wherein the inlet is operatively connected operatively to one or more milking robots.

12. A method for concentrating fresh raw milk, comprising:

supplying fresh raw milk to a liquid treatment system as claimed in claim 1;

pressurizing the system by supplying a gas thereto;

carrying the fresh raw milk through the system using the pump;

separating water from the fresh raw milk with the reverse osmosis membrane; and separately discharging the separated water and the concentrated milk.

13. The method as claimed in claim 12, wherein pressurizing the system comprises supplying an inert gas.

14. The method as claimed in claim 12, further comprising recirculating the milk through or along the reverse osmosis membrane.

15. The method as claimed in claim 12, wherein the temperature during the treatment lies in the range of 35-40° C.

16. The method as claimed in claim 12, wherein the treatment is performed at a pressure in the range of 10-100 bar.

17. The method as claimed in claim 12, wherein pressurizing the system comprises supplying an inert gas, the method further comprising recirculating the milk through or along the reverse osmosis membrane, wherein the temperature during treatment lies in the range of 35-40° C.

* * * * *